Dec. 8, 1931.   B. HUNZIKER   1,835,399
PIPE OR ROD COUPLING
Filed Aug. 6, 1928
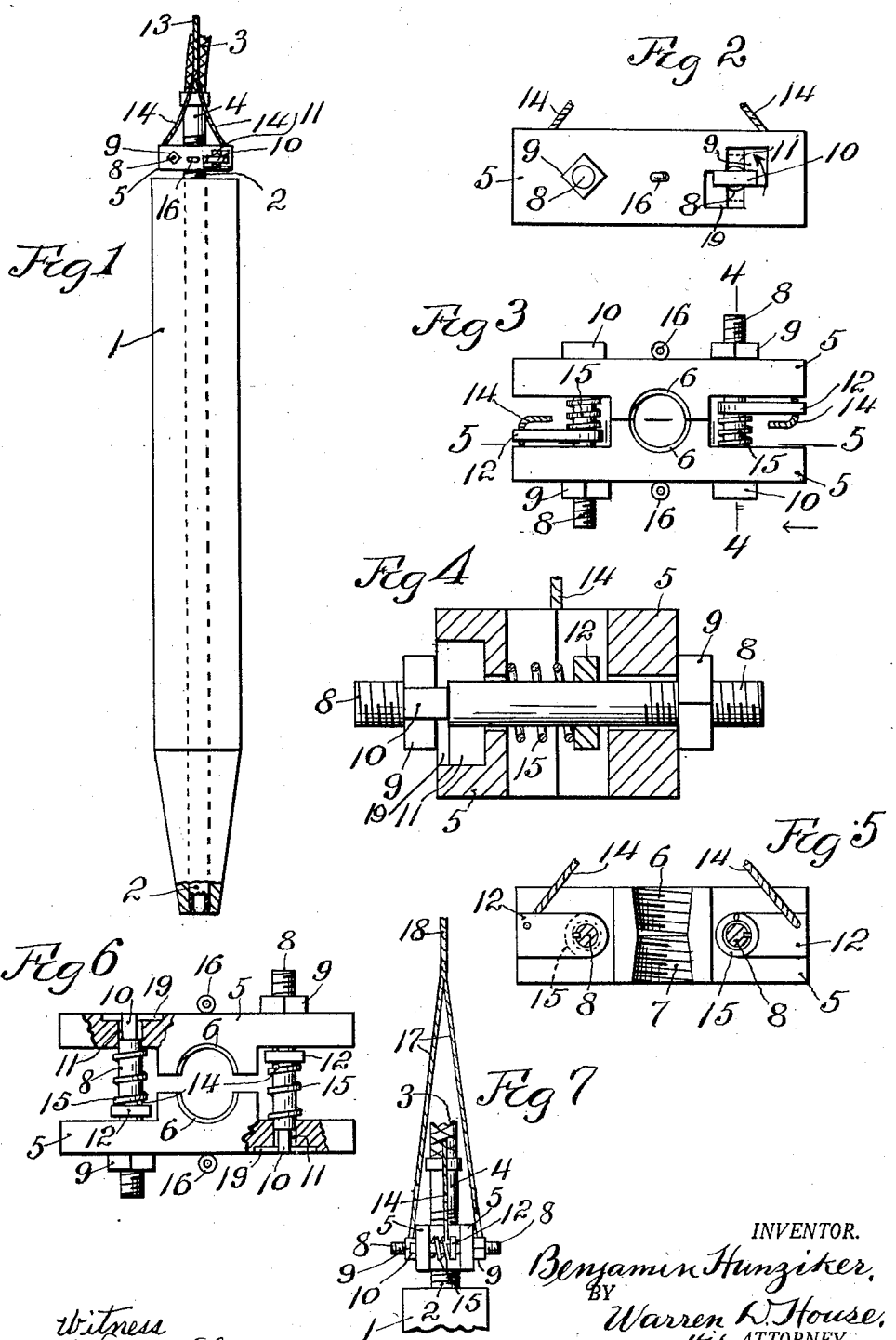

Patented Dec. 8, 1931

1,835,399

UNITED STATES PATENT OFFICE

BENJAMIN HUNZIKER, OF KANSAS CITY, MISSOURI

PIPE OR ROD COUPLING

Application filed August 6, 1928. Serial No. 297,734.

My invention relates to improvements in pipe or rod couplings.

It is particularly adapted for use in coupling together the water supply hose of a pile setting mechanism with the center pipe of a concrete pile, which is set by churning it vertically while water is discharged from the supply hose through the center pipe of the pile.

One of the objects of my invention is to provide a novel coupling of the kind described, which is simple, cheap, strong, durable, not likely to break or get out of order, which is easily attached, and which is as easily detached after the operation of setting the pile has been completed.

The novel features of my invention are hereinafter fully described and claimed.

In the accompanying drawings, which illustrate the preferred embodiment of my invention, Fig. 1 is a side elevation, partly broken away, of a concrete pile and my improved coupling connecting the center pipe of the pile with the supply hose.

Fig. 2 is an enlarged side elevation of my improved coupling.

Fig. 3 is a top view of the same showing the gripping members in the closed gripping position.

Fig. 4 is an enlarged section on the line 4—4 of Fig. 3.

Fig. 5 is a section on the line 5—5 of Fig. 3.

Fig. 6 is a plan view, enlarged and partly broken away of the coupling, showing the gripping members in the open positions.

Fig. 7 is a reduced elevation, taken at right angles to that shown in Fig. 1, showing the coupling connected to the pile and to the supply hose, part of the latter and part of the pile being broken away.

Similar reference characters designate similar parts in the different views.

1 designates an ordinary concrete pile having extending through it a center pipe 2 through which water is forced from a supply hose 3 in the operation of setting the pile. The latter is lifted and let fall while water is being discharged from the pipe 2 at the tapering lower end of the pile.

The object of my invention is to connect by my improved coupling the pile pipe 2 with the nipple 4 with which the lower end of the hose 3 is provided.

My improved coupling comprises two gripping members 5, each of which is provided with two oppositely tapered threaded recesses 6 and 7, said recesses cooperating with the corresponding recess of the other member for respectively receiving the nipple 4 and the threaded upper end of the pipe 2.

For holding the members 5 in clamping engagement with the nipple 4 and the pipe 2, there are provided two horizontal connecting members comprising two bolts 8 which are extended through and are rotatably mounted in the members 5 and which are slidable in said members.

Respectively mounted on the bolts 8 are nuts 9 which respectively bear against the outer sides of the members 5.

Each bolt 8 is provided with a rectangular head 10 which bears against the outer side of the adjacent member 5, and which, when the bolt is turned at right angles to the locking position, shown in Fig. 4, and in solid lines in Fig. 2, is adapted to enter a recess 11 in the adjacent side of the adjacent member 5, as shown in Fig. 6, and in dotted lines in Fig. 2.

For turning the bolts 8 to the released positions in which they will enter the recesses 11, to permit the members 5 to move apart, to release the nipple 4 and pipe 2 each bolt 8 is provided with a crank arm 12. A vertically movable operating member, such as a cable 13 has at its lower end two branches 14 respectively attached, eccentrically to the axes of the bolts 8, to the crank arms 12, so that, when the cable 13 is lifted, the arms 12 will be swung to the upright position, shown in Fig. 6.

When the crank arms 12 are swung to the upright position, shown in Fig. 6, the bolts 8 will be turned so that the heads 10 will register with the recesses 11, at which time, the members 5 will be moved apart to the release positions by means of two coil springs 15 which respectively encircle the bolts 8 and which, at one set of ends respectively bear against the inner sides of the members 5, and at their other ends against the crank arms 12.

To vertically reciprocate the pile 1, the members 5 may be respectively provided on their outer sides with two eyes 16 to which are respectively fastened the two branches 17 of a lifting cable 18, Fig. 7.

In the operation of the invention, the bolts 8 are turned to the positions shown in Fig. 6, in which positions, the springs 15 will force the members 5 to the open positions. The nipple 4 and pipe 2 are then placed between the members 5, so that the nipple 4 will engage the threaded parts 6 and the pipe 2 will engage the threaded parts 7. The nuts 9 are then loosened, so that the bolts 8 may be pushed through the members 5 to positions in which the heads 10 can pass out of the recesses 11.

The crank arms 12 are then turned to the positions shown in Fig. 3 upon which the heads 10 will bear against the outer sides of the members 5, Fig. 2. The nuts 9 are then turned so as to move the members 5 to the closed positions, shown in Fig. 3 and in Fig. 4, at which time, the nipple 4 and pipe 2 will be fitted in and held in the threaded recessed portions 6 and 7 respectively. The nipple 4 and the pipe 2 will thus be connected by the members 5, so that water can be forced from the nipple 4 through the members 5 and through the pipe 2. The pile may then be lifted and let fall by means of the cable 18 until the pile has been set. By then upwardly pulling the cable 13, the bolts 8 may be turned, as described, to the release positions.

The springs 15 will then force the members 5 apart, thus releasing the coupling from the nipple 4 and the pipe 2, upon which the coupling may be elevated for use in setting another pile.

To prevent the bolt heads 10 making more than a quarter turn, the heads may be mounted in depressions 19 at opposite sides respectively of each recess 11, as shown in Fig. 2, and in Fig. 6. These depressions are disposed so as to permit each bolt 8 to turn from the position shown in Fig. 2 only in the direction indicated by the arrow, and only one quarter of a revolution.

I do not limit my invention to the structure shown and described, as many modifications, within the scope of the appended claims, may be made without departing from the spirit of my invention.

What I claim is:—

1. A coupling comprising two gripping members having means adapted to grip between them the adjacent ends of two pipes or rods, a connecting member rotatable in said gripping members and slidable in one of the gripping members the slidable gripping member and said connecting member having connection means between them by which said connecting member when in one position will bear against and hold the latter gripping member in the gripping position, and, when said connecting member is rotated from said position, it will release the slidable gripping member to permit the latter to move from the gripping position, and means for turning the connecting member from its holding position.

2. A coupling comprising two gripping members having means adapted to grip between them the adjacent ends of two pipes or rods and provided with transverse registering holes, a bolt rotatable in said holes and slidable in one of the gripping members, the latter having in its outer side a lateral recess communicating with said hole in said member, said bolt having a head adapted, in one position of the bolt, to engage the said outer side of said gripping member in which it is slidable, and the bolt being rotatable from said position to a position in which said head will enter said recess and permit the slidable gripping member to move from the gripping position, a nut on said bolt adapted to bear against the other gripping member, and means by which said bolt may be turned from the holding position to the release position.

3. A coupling comprising two gripping members having means adapted to grip between them the adjacent ends of two pipes or rods and provided with transverse registering holes, a bolt rotatable in said holes and slidable in one of said members, the latter having in its outer side a lateral recess communicating with said hole in said member, the bolt having a head adapted, in one position of the bolt to bear against said outer side and hold the slidable gripping member in the gripping position, said head being adapted to enter said recess to release the slidable gripping member, when the bolt is turned from the holding to a release position, the bolt having a crank arm by which it may be turned, a nut on said bolt bearing against the other gripping member, a spring normally tending to force said gripping members apart, and means engaging said crank arm for turning said bolt to the released position.

In testimony whereof I have signed my name to this specification.

BENJAMIN HUNZIKER.